US008112925B2

(12) United States Patent
Tzuo

(10) Patent No.: US 8,112,925 B2
(45) Date of Patent: Feb. 14, 2012

(54) DISPLAY FOR AUTOMATIC ASSEMBLY SYSTEM

(76) Inventor: Chung Kwo Tzuo, Sao Paulo (BR)

( * ) Notice: Subject to any disclaimer, the term of this patent is extended or adjusted under 35 U.S.C. 154(b) by 331 days.

(21) Appl. No.: 11/920,448

(22) PCT Filed: Oct. 26, 2006

(86) PCT No.: PCT/BR2006/000228

§ 371 (c)(1),
(2), (4) Date: Sep. 14, 2009

(87) PCT Pub. No.: WO2008/049176

PCT Pub. Date: May 2, 2008

(65) Prior Publication Data

US 2010/0000131 A1 Jan. 7, 2010

(51) Int. Cl.

| | |
|---|---|
| ***G09F 15/00*** | (2006.01) |
| ***G09F 15/02*** | (2006.01) |
| ***G09F 1/08*** | (2006.01) |
| ***A47F 1/14*** | (2006.01) |
| ***A47G 1/16*** | (2006.01) |
| ***A47B 97/04*** | (2006.01) |
| ***F16M 13/00*** | (2006.01) |

(52) U.S. Cl. ...... 40/610; 40/539; 40/124.07; 40/606.12; 40/606.18; 248/473; 248/489; 248/459; 248/560; 248/147; 281/15.1

(58) Field of Classification Search .................... 40/610, 40/539, 124.07, 606.12, 606.18; 248/473, 248/489, 459, 560, 147; 281/15.1
See application file for complete search history.

(56) References Cited

U.S. PATENT DOCUMENTS 7,726,054 B2 * 6/2010 Mestres Armengol et al. .......................... 40/124.07
7,774,964 B2 * 8/2010 L'Hotel .......................... 40/539
2002/0171023 A1 11/2002 Hotel
2005/0279906 A1 12/2005 Moss et al.
2006/0038393 A1 2/2006 Sgambellone

FOREIGN PATENT DOCUMENTS

DE 299 18 754 U1 4/2001

OTHER PUBLICATIONS

Notification concerning Transmittal of international preliminary report on patentability for related PCT/BR2006/000228.
Search report for related PCT/BR2006/000228.

* cited by examiner

*Primary Examiner* — Joanne Silbermann
*Assistant Examiner* — Syed A Islam
(74) *Attorney, Agent, or Firm* — Husch Blackwell LLP

(57) ABSTRACT

"IMPROVEMENT IN DISPLAY FOR AUTOMATIC ASSEMBLY SYSTEM" wherein one automatic assembly part (11) formed by two walls (12) with wrinkles (13), agreeing by other wrinkles (14) to two walls (15) separated from each other by their free edges (16), form one hinging part in a system of tweezers. The part (11), grooves (17) and (18) on its walls (12), receives an elastic band (19) inserted in hook-shaped grooves (8) and (10) of the juxtaposed rims (4), (5) and (6), (7) of both parts composing the body of the display (1). The part (11), by its walls (12) and walls (15), respectively accommodates between internal faces and the folds of the rims (4), (5) and (6), (7) of parts (2) and (3) composing the body of the display (1). Therefore, by working in form of tweezers combined to the elastic action, the part (11) may extend and become plain when the display (1) is closed and folded, while, after being vertically positioned and just a slight opening of its parts (2) and (3), they are automatically put apart from each other by hinging the walls (12) and (15) of the part (11), causing the display to be automatically assembled.

4 Claims, 7 Drawing Sheets

DISPLAY FOR AUTOMATIC ASSEMBLY SYSTEM

CROSS REFERENCE TO RELATED APPLICATIONS

This application claims priority of PCT/BR2006/00028, filed Oct. 26, 2006.

The present description refers to an application for a patent of invention for a display receiving a series of assembly units, or assembly parts, each one basically composed by two foldable walls formed by a wrinkle, also in agreement by means of wrinkles with two adjacent walls, separated from each other by their free edges, being moved by a system of tweezers, being said assembly part liable to receive an elastic band through which it will be fixed to especially made grooves at pre-determined spots of the juxtaposed rims from both parts forming the display body.

Thus, the assembly part rests its foldable walls over the internal faces of the parts forming the display body and, by action of the elastic band, jointly with the effect of tweezers provided by the separate walls, said display is automatically opened, also allowing it to close if required.

STATE OF THE ART

Varieties of devices acting to form self-supporting displays are already known in the market and may be seen in documents such as BR 0,303,694-4, filed on Aug. 14, 2003, BR 0,303,693-6, filed on Aug. 14, 2003, BR 0,502,306-8, filed on Jun. 21, 2006, BR 0,505,915-1, filed on Dec. 27, 2005, FR A 1 0106569, filed on May 18, 2001, and BR 0,007,143-9A, filed on Jul. 11, 2000. The latter one also mentions French documents such as FR-A-2680030, FR-A-2650907 and FR-A-2210317, while the document BR 0,201,711-3, filed on May 10, 2002, also mentions other two French documents, namely FR 2,760,880 and FR 2,795,217.

In the case of document FR A1 0106569, a device formed by carton parts with various fitting and elastic elements is disclosed, including a set of details in the form of grooves, folds, wrinkles and others, working to allow the set to be practically automatically assembled, so to obtain a prismatic vertical structure with means to receive general advertising.

Generally speaking, documents present devices having means to offer displays with self-supporting characteristics, i.e. to be automatically opened, working by means of a generally diagonal complementary internal structure, some of them elastically or telescopically, liable to be extended or retracted to assemble the set.

Concerning other documents, some of them with no internal complementary structure, we can see that all of them show devices obtained by means of semi-rigid parts of carton, projected with grooves, fittings, wrinkles, folds and other details allowing to assemble the set.

Therefore, each one of the above devices presents constructive and functional details characterizing different solutions to overcome one or another disadvantage over the existing state of the art.

Thus, known devices present appropriate means to meet different purposes, mainly to form a self-supporting advertising display which is substantially vertically elongated, and also to allow to be sold (ex factory) fully disassembled or folded, substantially facilitating its transport, stocking and storing while not in use.

Despite accomplishing, in a way, proposed objects, such conventional devices present complex constructivity, also generating a range of equally complex assembly details, resulting in products with really very high cost and many of them also have an internally located complementary structural part to obtain the self-supporting condition, i.e. the condition for its automatic assembly.

OBJECT OF THE PATENT

A defined embodiment for the device to be able to have a really simplified construction over conventional devices is proposed in the present patent application by an assembling part made of a square tubular body, formed by two walls which may be folded by a wrinkle which, from other wrinkles, agree with two separate walls by their juxtaposed free edges. Said foldable walls receive a pair of aligned higher and lower grooves each, into which an elastic ring band is fitted.

On the other hand, the display has junction rims for the two parts composing its body, folded and juxtaposed, both receiving identical grooves forming higher and lower hooks, through which the ends of the elastic ring band will be fitted as already fixed to the grooves of foldable walls of the assembly part.

Therefore, the already fixed assembly part rests by means of its foldable walls to the internal faces of both parts composing the body of the display, being tensioned by the action of the elastic band. Separate walls of the assembly part, on the other hand, embrace each side of the juxtaposed rims of said parts composing the display, acting as tweezers, jointly to the action of the elastic band.

Therefore, when both parts composing the display are pressed against each other, i.e. in the case of a closed display folded by its sections, the assembly part, by operation of the tweezers, also has its walls—both foldable and separate, extended but tensioned by the action of the elastic band.

After unfolding and vertically positioning the display, its two parts get slightly apart, just enough for the elastic band, tensioned between the grooves of juxtaposed rims, to open foldable walls of the assembly part. When opened, foldable walls, jointly to the separate walls acting as tweezers, naturally force both parts composing the body of the display to get apart, thus obtaining their automatic assembly.

Assembly parts will be applied to as many units as required, always in pairs and opposed to the juxtaposed rims of the parts composing the body of the display.

Apart from quadrangular configuration, the assembly part may have triangular configuration, as we will see below, so to allow quadrangular (rectangular or even square) displays to be formed, besides elliptical ones. Thanks to the system of tweezers, the wrinkling itself of juxtaposed rims of the parts composing the display may vary, so to allow other automatic assembly options for displays, both elliptical and quadrangular.

Having been superficially explained, the display with its assembly part and the involved system are now better detailed by means of the attached figures.

BRIEF DESCRIPTION OF THE DRAWINGS

Figures as listed below, from 1 to 8, refer to an ellipsoidal display, where juxtaposed rims of both parts composing its body are formed from a wrinkle, receiving the assembly part having, in this case, quadrangular configuration.

Figure 9:
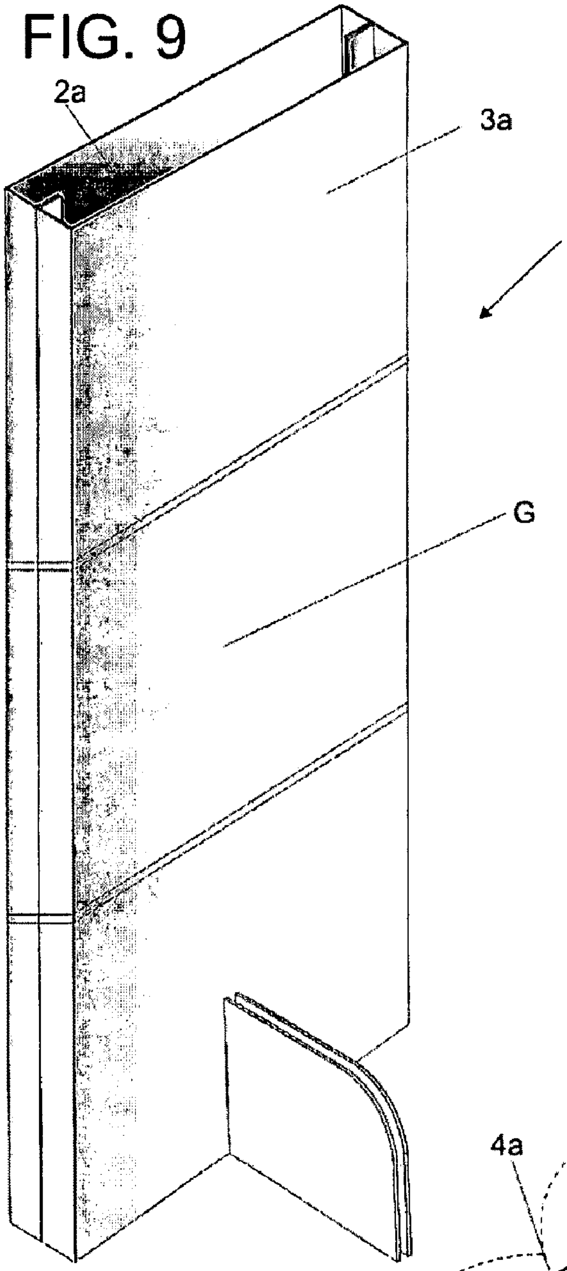
Figure 10:
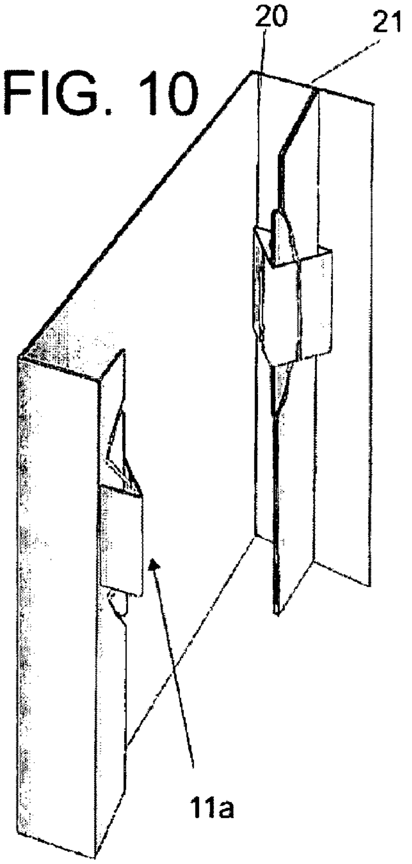
Figure 11:
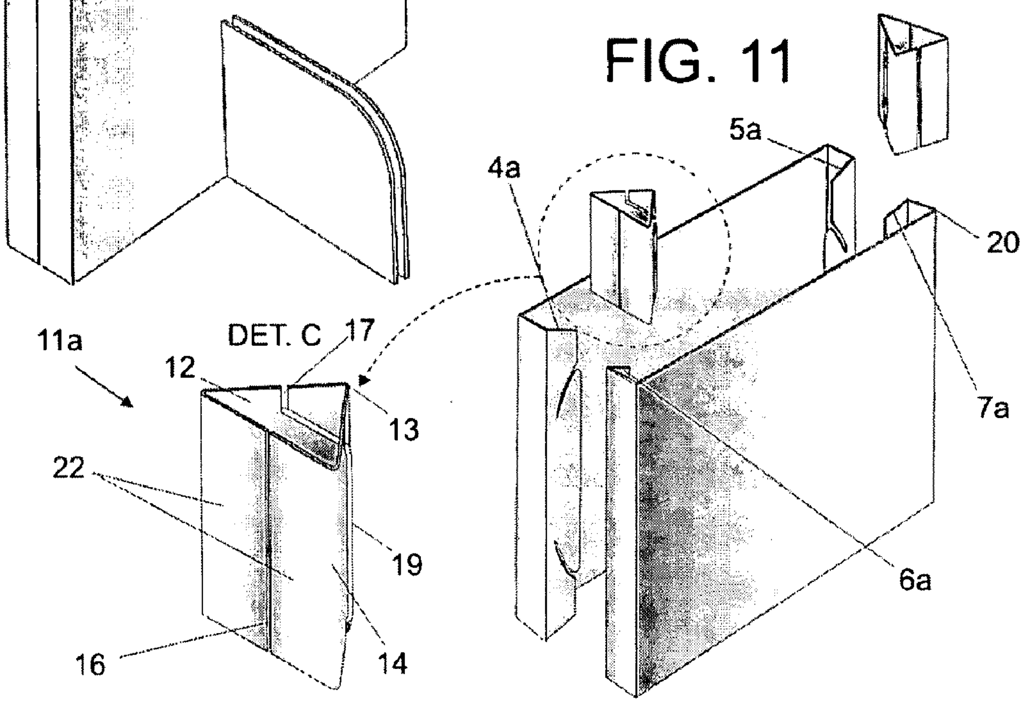
Figure 12:
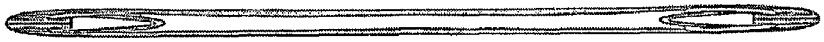
Figure 13:
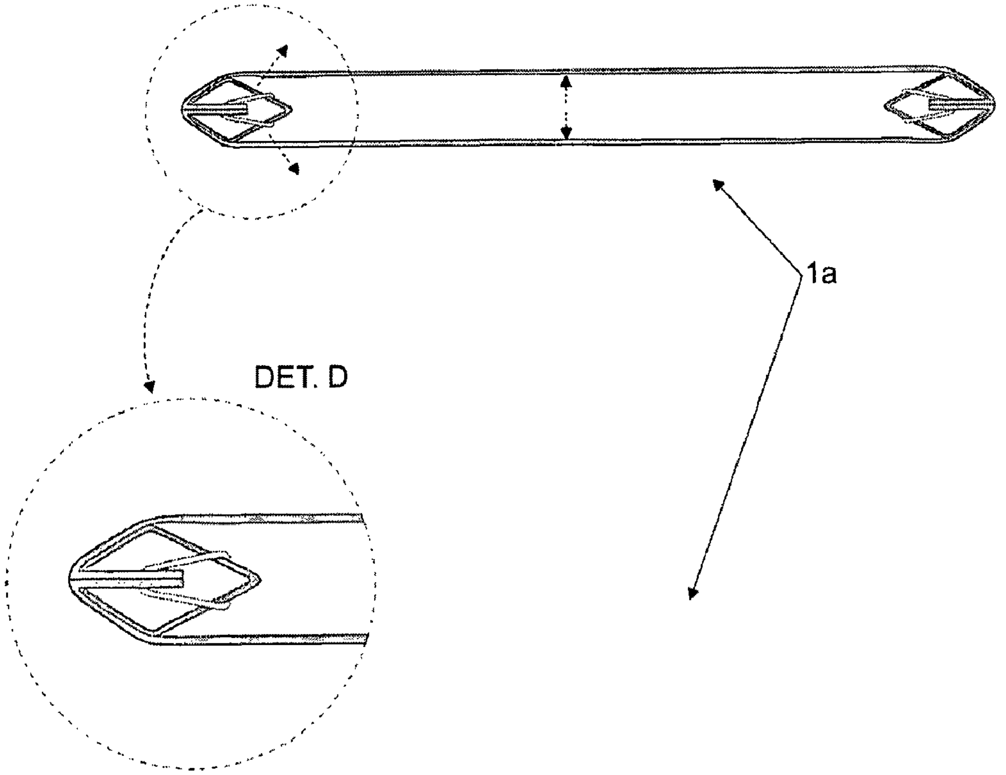
Figure 14:
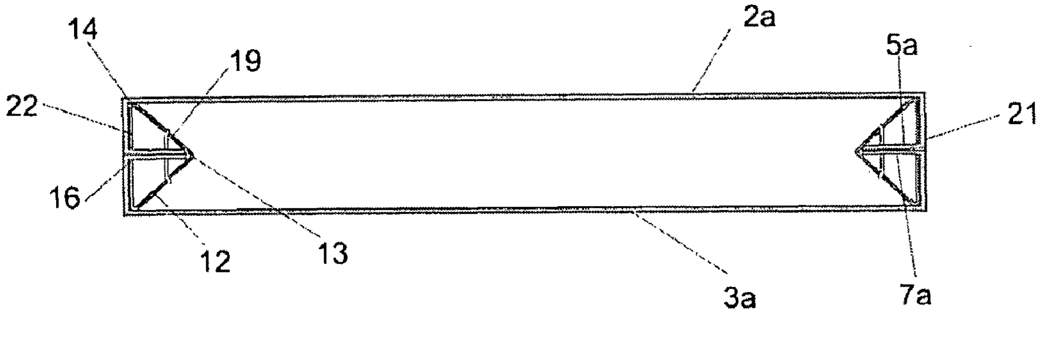
Figure 15:
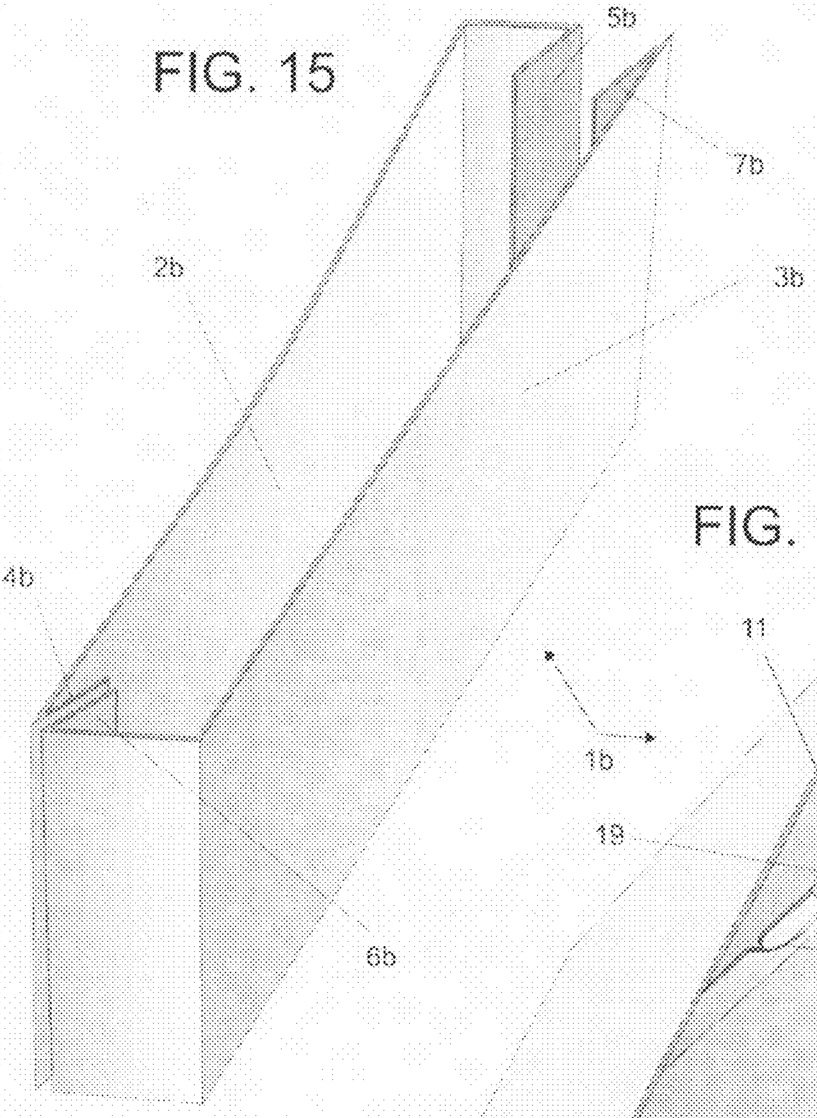
Figure 16:
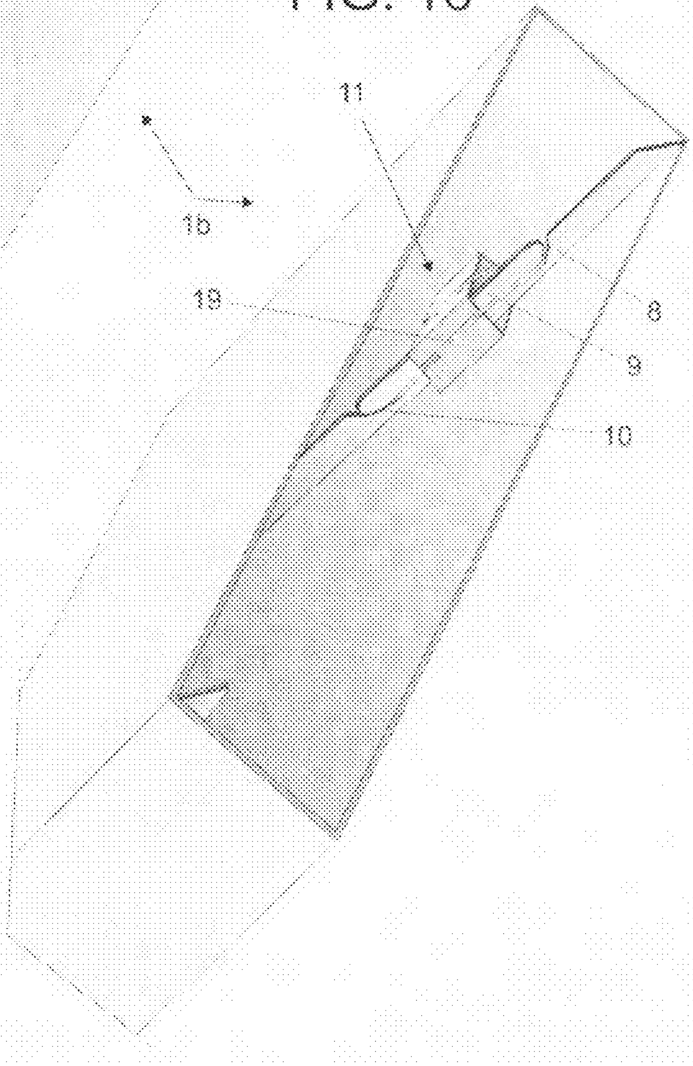
Figure 17:
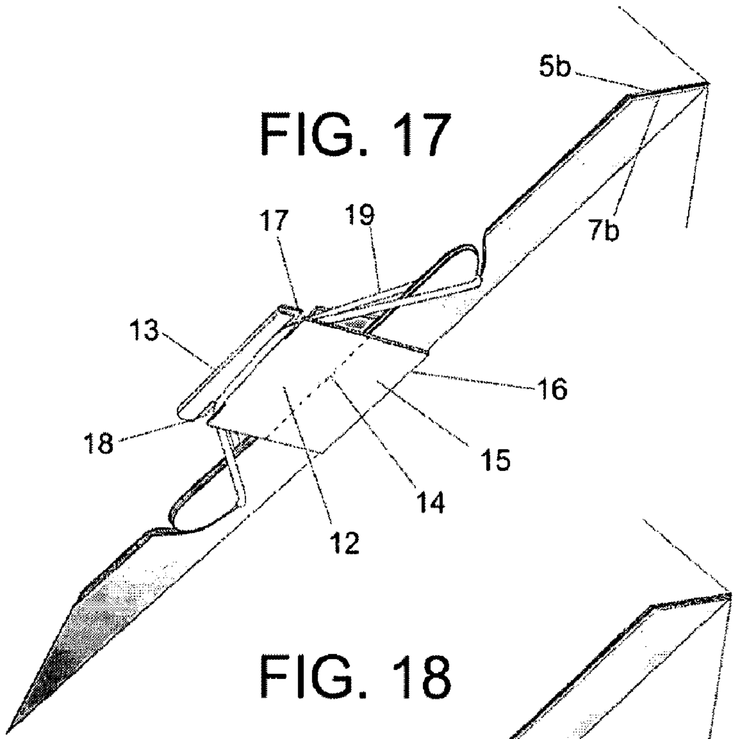
Figure 18:
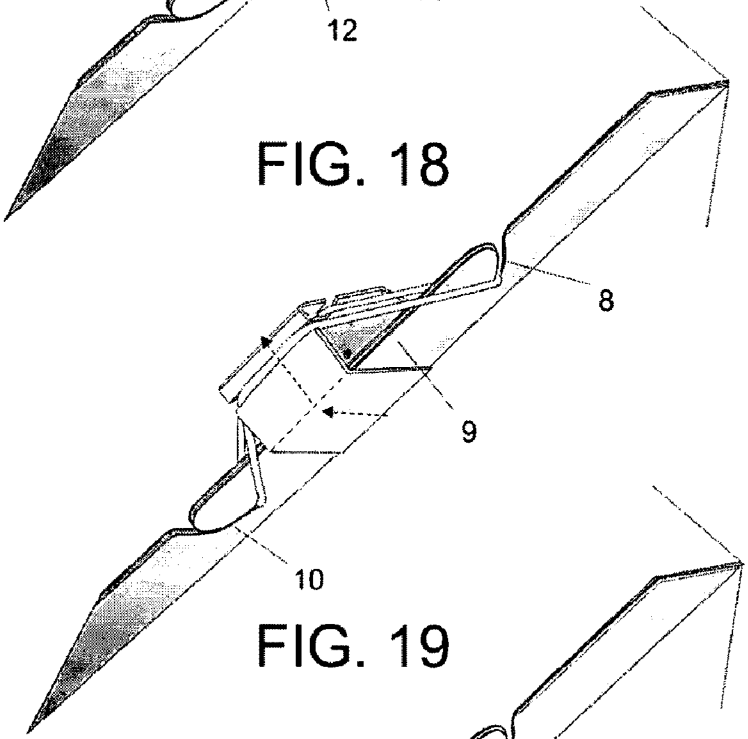
Figure 19:
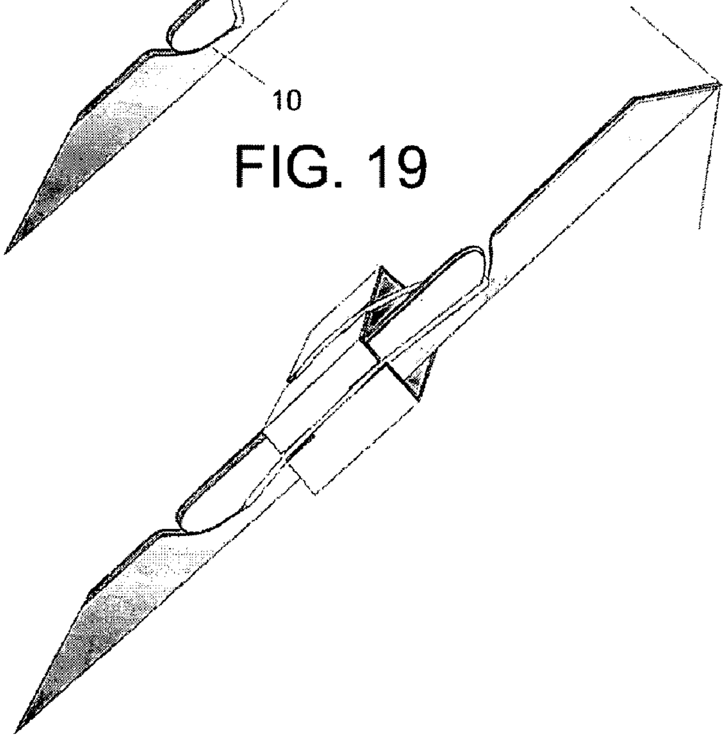
Figure 20:
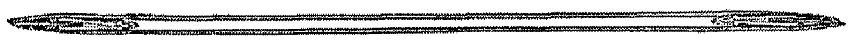
Figure 21:
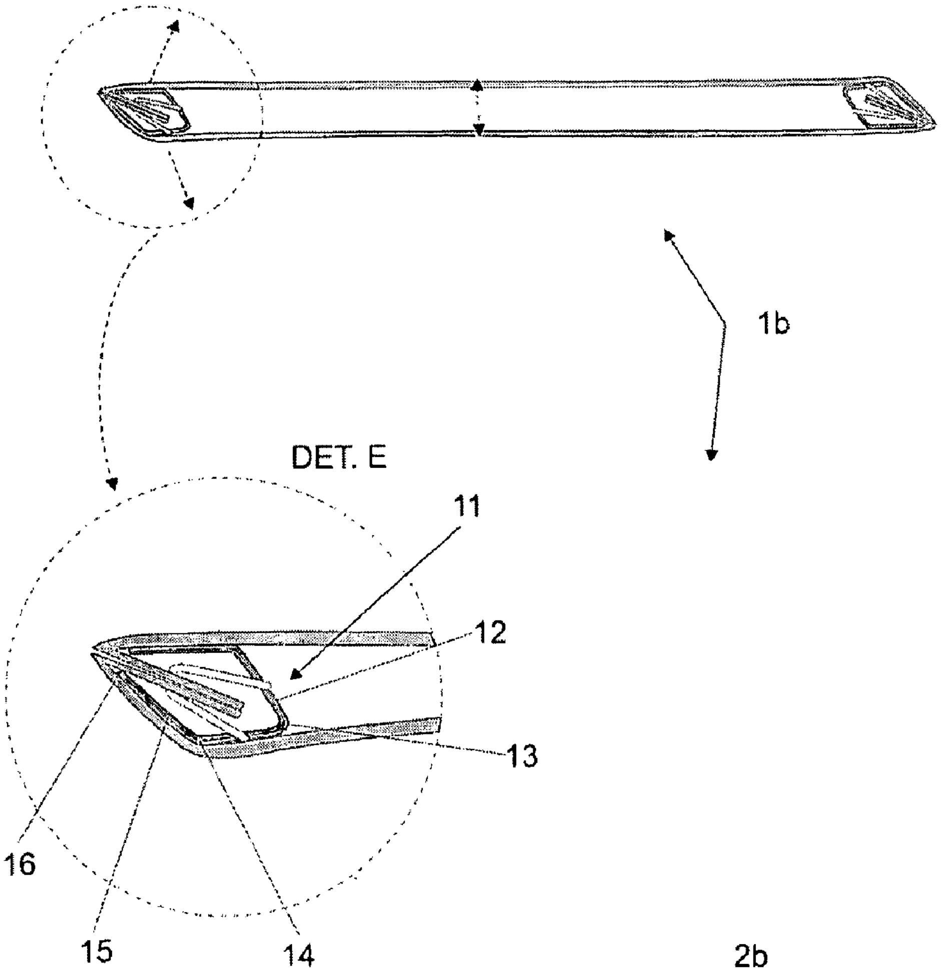
Figure 22:
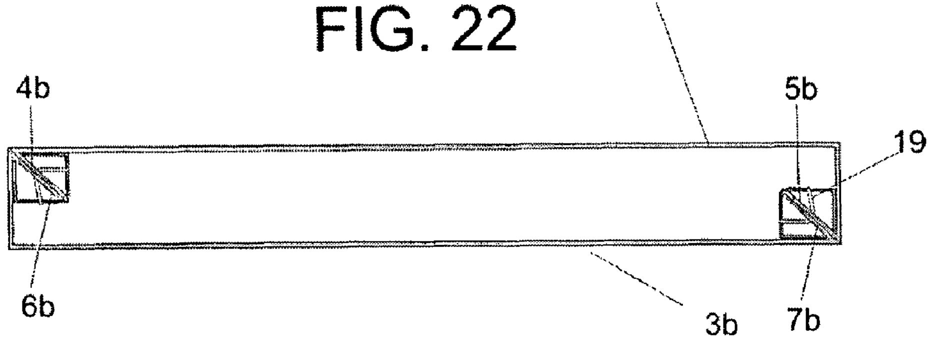

Figures as listed below, from 9 to 14, refer to a quadrangular (rectangular) display, where the two parts composing its body receive two wrinkles each made shortly from the juxtaposition rims. In this case, the rims project from an intermediate point in the display after being assembled and receive the assembly part, which has, in this case, a triangular configuration;

FIG. 9—Perspective view of the display showing, from its higher edge, juxtaposed rims from both parts composing its body, also formed from an intermediate point, receiving the assembly part, with triangular configuration;

FIG. 10—Higher part of the display, with one of the parts composing its body, showing juxtaposed rims with their higher and lower hook-shaped grooves, so to receive the elastic ring band to fix and tension the assembly part, in this case in triangular configuration;

FIG. 11—Perspective view of the two parts composing the body of the display, separately, showing hook-shaped grooves of juxtaposed rims, through which the elastic ring band will be fitted to fix and tension the triangular assembly part. On its side, enlarged detail C of the assembly part with its foldable walls open, in a position to keep the display as assembled;

FIG. 12—View of the closed display. The walls of the assembly part extend jointly with both parts composing the body of the display;

FIG. 13—View as per previous figure, with both parts composing the body of the display being kept apart through the opening of the foldable walls of the assembly part, thanks to the action of the elastic band and the effect of tweezers of its separate walls; Below, enlarged detail D;

FIG. 14—View of the display as already assembled;

Figures as listed below, from 15 to 21, refer to a quadrangular (rectangular) display, where the two parts composing its body receive just one wrinkle, at a point near just one of the folds of its juxtaposition rims. The parts thus composed should be glued so that their only wrinkles remain inverted and juxtaposition rims are consequently projected in opposition, one at each opposed vertex from the quadrangular display;

FIG. 15—Perspective view of the two parts composing the body of the display, each one provided with one single wrinkle from just one of its juxtaposition rims. When parts are assembled, wrinkles position themselves, consequently in inverted position, at opposed vertexes, thus obtaining another kind of assembly;

FIG. 16—Perspective view of the display showing, from its higher edge, the pairs of juxtaposed rims from both parts composing its body, each one receiving its corresponding assembly part;

FIGS. 17 to 19—Perspective sequence showing the opening of foldable parts from the assembly part, by action of the tensioned elastic band between the grooves of juxtaposed rims, combined to the effect of tweezers as provided by separate walls. Said opening will naturally make both parts composing the body of the display come apart, automatically opening it;

FIG. 20—View of the closed display. The walls of the assembly part extend jointly with both parts composing the body of the display;

FIG. 21—View as per previous figure, with both parts composing the body of the display being opened, when the foldable walls of the assembly part also open thanks to the action of the elastic band and the effect of tweezers of its separate walls; Below, enlarged detail E;

FIG. 22—View of the display as already assembled. In this view, we can see inverted rims thanks to the formation of the wrinkle, as effected at the cutting and wrinkling step as per the project.

DETAILED DESCRIPTION OF THE DRAWINGS

In agreement with the attached drawings, the "IMPROVEMENT IN DISPLAY FOR AUTOMATIC ASSEMBLY SYSTEM" object of the present application for a patent of invention is constituted by a display (1) of carton or another appropriate material, presenting elliptical crosswise section, formed by a front (2) and end (3) part, both provided with crosswise wrinkles (4) forming sections (5) for folding, being said parts liable to receive advertising printing and furthermore folded lengthwise at their ends, so to form, on part (2), rims (4), (5) and, on part (3), rims (6), (7).

For the intended system, rims (4), (5) and (6), (7) receive, at the cutting and wrinkling step, at pre-determined spots, preferably at each section (5), a higher hook-shaped groove (8) which, after a short free path (9), is invertedly repeated into a lower groove (10).

Parts (2) and (3), after being assembled by means of juxtaposition of their rims (4), (5) with rims (6), (7), already containing their grooves (8) and (10) receive, at their sections (5), at least one assembly part (11) in a tubular body in quadrangular section, formed by two foldable walls (12) by a central wrinkle (13) which, after new wrinkles (14), project two adjacent walls (15), apart from each other, at their free edges (16).

Figure 1:
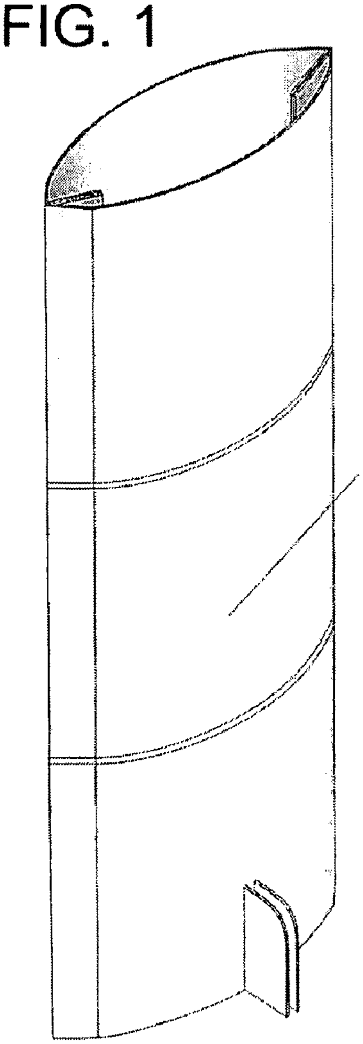
FIG. 1—Perspective view of the display showing, from its higher edge, juxtaposed rims from both parts composing its body.
Figure 2:
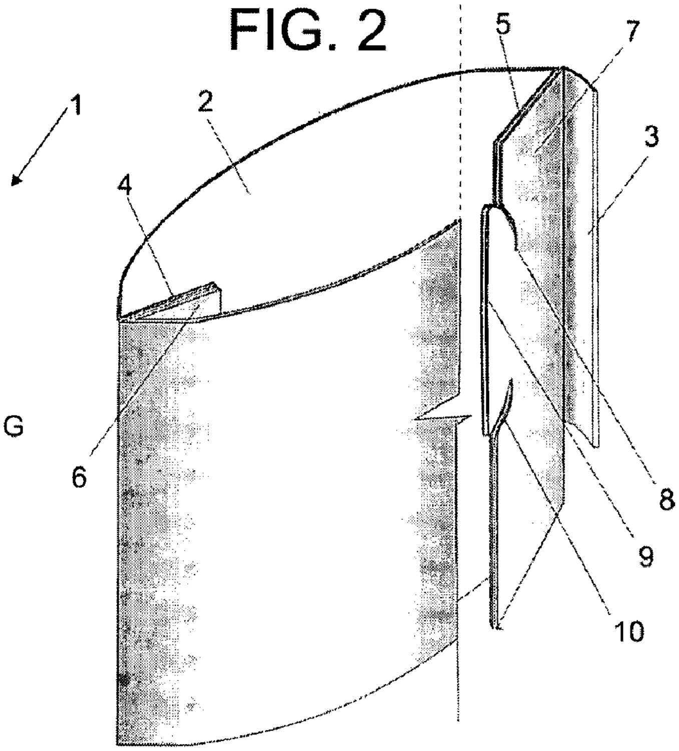
FIG. 2—Higher part of the display, with one of the parts composing its body being cut, showing juxtaposed rims with their higher and lower hook-shaped grooves, so to receive the elastic ring band to fix and tension the assembly part.
Figure 3:
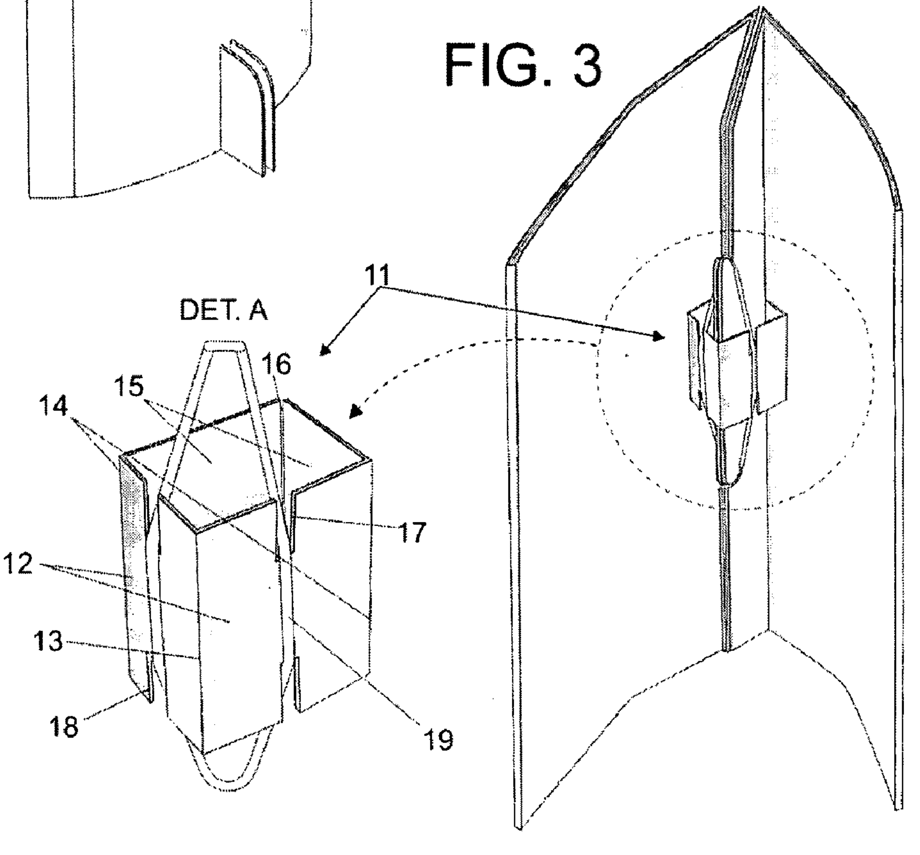
FIG. 3—Perspective view of a part of juxtaposed rims, which grooves receive the elastic ring band to fix and tension the assembly part. On its side, enlarged detail A of the assembly part with its foldable walls open, in a position to keep the display as assembled.

The walls (12) receive a pair of grooves each, projected from their higher and lower edges, being therefore a higher vertical groove (17) and a lower vertical groove (18), both aligned and made in juxtaposition, receiving the introduction of an elastic ring band (19). As especially shown by detail A of FIG. 3, the ring band (19) involves, through grooves (17) and (18), foldable walls (12).

Being thus the set constituted, the assembly part (11) installed in pairs has its elastic band (19) introduced, from its edges, between higher (17) and lower (18) grooves of the juxtaposed rims (4), (5) and (6), (7), so to rest their foldable walls (12) to the internal faces of both parts (2) and (3) composing the body of the display (1). On the other hand, separate walls (15) are anchored by their free edges (16) to the foldings of the rims (4), (5) and (6), (7), so to embrace them in the form of tweezers.

Therefore, when both parts (2) and (3) get close to close the display (1), separate walls (15), due to the effect of tweezers, allow the whole assembly part (11) to extend, taking plain condition but remaining strongly tensioned by the action of the elastic band (19).

Figure 4:
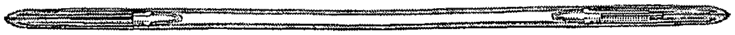
FIG. 4—Plain view of the closed display. Under this condition, the walls of the assembly part extend jointly with both parts composing the body of the display.
Figure 5:
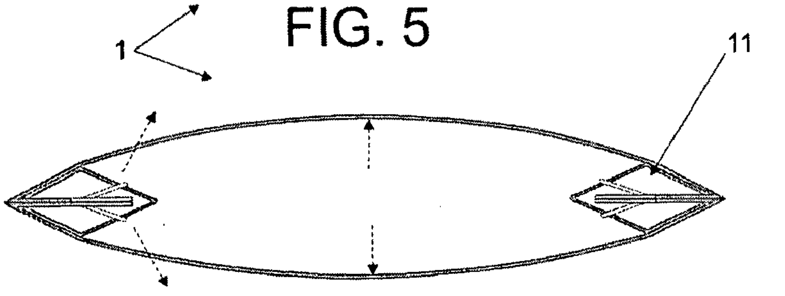
FIG. 5—View as per previous figure, with both parts composing the body of the display being opened, when the foldable walls of the assembly part get apart thanks to the action of the elastic band and the effect of tweezers of its separate walls.
Figure 6:
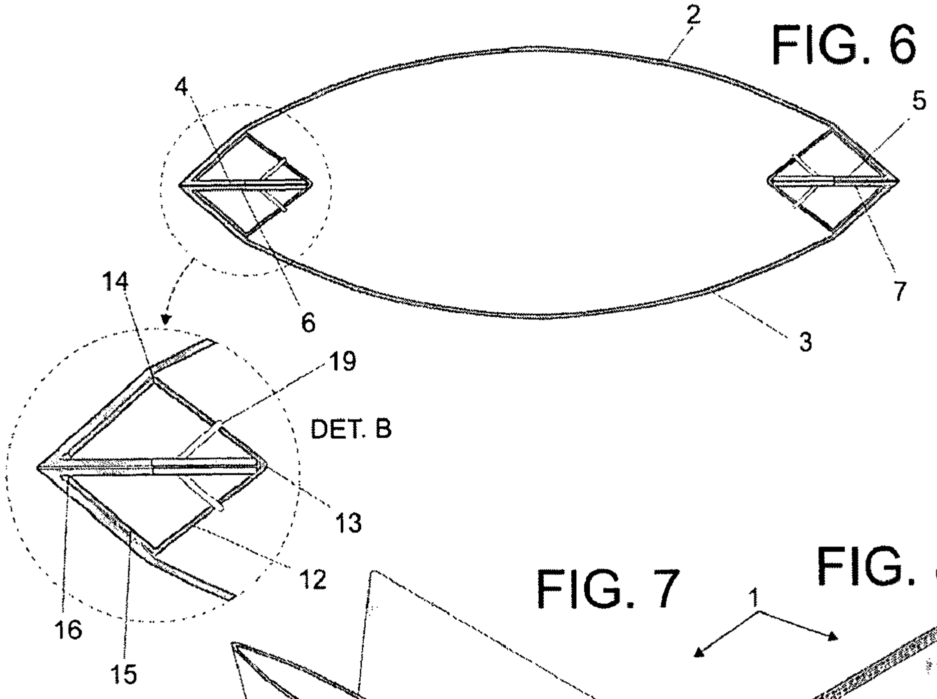
FIG. 6—View of the display as already assembled. Below, enlarged detail B.
Figure 7:
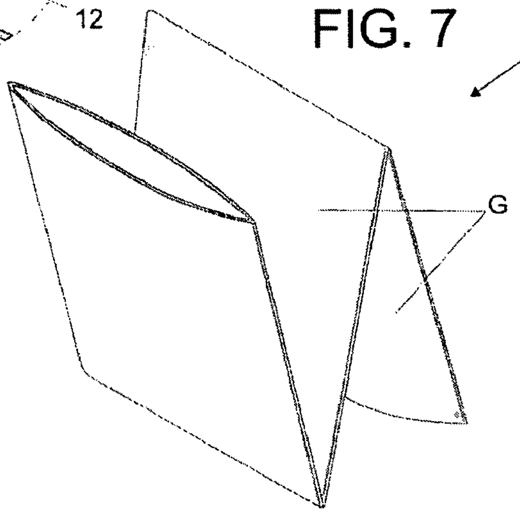
FIG. 7—Illustrative view showing the display in perspective being closed.
Figure 8:
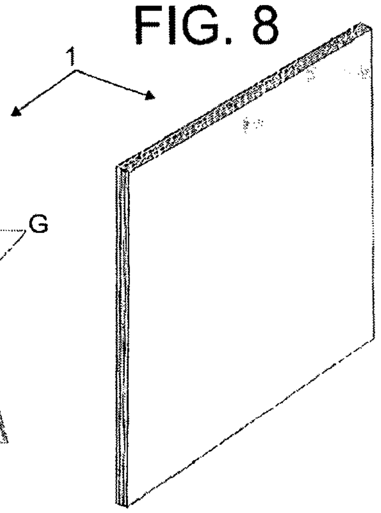
FIG. 8—View of the previous figure, showing the display as already closed.

To open it, when the display (1) is positioned vertically, after slightly taking apart both parts (2) and (3), foldable walls (12) then tensioned, jointly to the effect of tweezers from separate walls (15), open, causing both parts (2) and (3) to naturally get apart, thus automatically assembling the display (1), as especially shown by FIGS. 4, 5 and 6.

The above description refers to an ellipsoidal display (1), when wrinkles are made from folding juxtaposition rims (4), (5) and (6), (7) themselves.

In the case of forming quadrangular or rectangular displays (1*a*), their two parts (2*a*) and (3*a*) receive a wrinkle (20) after each one of the rims (4*a*), (5*a*) and (6*a*), (7*a*), keeping the same system, to fix and tension assembly parts (11*a*). In this case, the parts (2*a*) and (3*a*), after being joined, form juxtaposed rims (4*a*), (5*a*) and (6*a*), (7*a*) projected from an intermediate point in the body of the sides (21) of the display (1*a*). Assembly parts (11), on the other hand, after the wrinkles (14), project coplanar walls (22), equally separated by their free edges (16).

With such constitution, the part (11*a*) takes triangular shape and rests their coplanar walls (22) to the sides (21) of the body of the display (1), with free edges (16) equally involving, under the same system of tweezers, rims (4*a*), (5*a*) and (6*a*), (7*a*).

Finally, in another version, by using the same self-assembling system, both parts (2*b*) and (3*b*) composing the body of the display (1*b*) receive just one wrinkle (23), at a point just near one of the folds of its juxtaposition rims. Both parts (2*b*) and (3*b*) thus composed should be glued so that their only wrinkles (23) remain inverted, as shown by FIG. 15, and juxtaposition rims (4*b*), (5*b*) and (6*b*), (7*b*) are consequently joined, projected in opposition, one at each opposed vertex of the display (1*b*), causing its quadrangular shape.

According to the longer distance from the wrinkle (23) over juxtaposition rims (4*b*), (5*b*) and (6*b*), (7*b*), display (1*b*) may progress from a rectangular shape to square shape.

The invention claimed is:

1. A display for an automatic assembly system, comprising a display presenting an elliptical crosswise section, formed by a front part and a rear part, both of said front and rear parts provided with crosswise bends forming a plurality of foldable sections, said front and rear parts capable of receiving advertising printing, said display being folded lengthwise at its ends, forming front flaps on said front part and rear flaps on said rear part, said flaps receiving an upper hook-shaped groove and a lower hook-shaped groove, with said front and rear parts, after assembly of the front and rear flaps in adjacent fashion, a fastening part, said fastening part having a tubular body in quadrangular section, formed by a folded wall with three bending portions and two open ends, the two open ends next to but spaced from each other, said walls receiving a pair of vertical open grooves each, on each of the higher and lower periphery thereof, and an elastic band for placement into the grooves.

2. The display of claim 1 further comprising by the folded walls being adjacent to the internal faces of front and rear parts to form the body of the display, being separate walls anchored by the open ends to the flaps and securing them.

3. The display of claim 2, when both front and rear parts get closer to close the display, wherein the fastening part exerts a strong tension from the elastic band on the two open ends.

4. The display of claim 2, when the display is positioned vertically, after slightly spacing the front and rear parts, wherein by opening all of the folded walls at the same time causes both upper and lower parts to open to assemble the display.

* * * * *